(12) United States Patent
Kuo

(10) Patent No.: US 7,150,556 B2
(45) Date of Patent: Dec. 19, 2006

(54) LIGHT SOURCE STRUCTURE

(76) Inventor: Heng Sheng Kuo, P.O. Box 26-757, Taipei City 106 (TW)

( * ) Notice: Subject to any disclaimer, the term of this patent is extended or adjusted under 35 U.S.C. 154(b) by 106 days.

(21) Appl. No.: 10/945,213

(22) Filed: Sep. 20, 2004

(65) Prior Publication Data

US 2005/0157519 A1   Jul. 21, 2005

Related U.S. Application Data

(63) Continuation-in-part of application No. 10/759,951, filed on Jan. 16, 2004, now abandoned.

(51) Int. Cl.
*F21V 7/04* (2006.01)
*G02F 1/1335* (2006.01)

(52) U.S. Cl. .......................... 362/613; 349/68
(58) Field of Classification Search ................ 362/611, 362/612, 613; 349/68, 69, 70
See application file for complete search history.

(56) References Cited

U.S. PATENT DOCUMENTS 4,235,527 A * 11/1980 Greubel et al. ............... 349/58
6,784,469 B1 * 8/2004 Yamane et al. ............. 257/222
2003/0043567 A1 * 3/2003 Hoelen et al. ................ 362/31
2003/0227768 A1 * 12/2003 Hara et al. .................... 362/31
2006/0002141 A1 * 1/2006 Ouderkirk et al. .......... 362/609

* cited by examiner

*Primary Examiner*—Renee Luebke
*Assistant Examiner*—Julie A. Shallenberger
(74) *Attorney, Agent, or Firm*—Apex Juris, pllc; Tracy M Heims

(57) ABSTRACT

A light source structure includes a guidelight plate, a visible-light member disposed on at a first side of the guidelight plate, and an infrared-radiation member disposed on a second side of the guidelight plate. Whereby the visible-light member and the infrared-radiation member reveal a surface of a predetermined object, and provide revealed images that is capable of combining as a complete image. According to particular locations of the visible-light member and the lighting components, the light source structure is thin and cheap, with an additional benefit with high uniformity thereof.

5 Claims, 6 Drawing Sheets

LIGHT SOURCE STRUCTURE

CROSS-REFERENCE TO RELATED APPLICATIONS

This application is a Continuation-in-Part of application Ser. No. 10/759,951, filed 16 Jan. 2004 now abandoned, and entitled LIGHT SOURCE STRUCTURE.

BACKGROUND OF THE INVENTION

1. Field of the Invention

The present invention relates to a light source structure, and particularly relates to a light source structure adopted for a scanner for scanning documents, negative or positive films.

2. Background of the Invention

With reference to FIGS. 1 and 2, a conventional light source structure adopted for a conventional scanner includes a guidelight plate 9 and a lighting unit 8. The lighting unit 8 includes a lamp 80 and an infrared-radiation member 81, which are composed of a circuit board 82, a plurality of LEDs and resistors disposed on the circuit board 82. The guidelight plate 9 is flat, rectangular and transparent, and has a cutout 90 partially formed at an elongated side 91 thereof for receiving the lamp 80 therein. The lighting components 81 are set to be adjacent to the lamp 80 and the elongated side 91 of the guidelight plate 9 simultaneously, so that the lighting components 81 and the lamp 80 are together disposed on the same side, the elongated side 91, of the guidelight plate 9. The LEDs provide visible light to be an auxiliary lighting in order to enhance the luminance, while the lamp 80 provides the primary lighting.

The lighting components 81 and the lamp 80 are together disposed on the elongated side 91 of the guidelight plate 9 in an up-and-down manner, light from the LEDs travels longer than that from the lamp 80 due to the different thickness thereof. A uniformity of the guidelight plate 9 cannot increase thereby. In addition, the light from the lamp 80 is interfered by a corner around the cutout 90 to further decrease the uniformity of the guidelight plate 9. For mating with the lamp 80, the guidelight plate 9 should be thick enough, and materials and costs will be consumed.

Although the LEDs and the lamp 80 provide the luminance of the conventional light source structure simultaneously, there are some scanning problems in the conventional scanner, such as vague images or low contrast. The conventional light source structure is originally applied not only to the conventional scanner, also to various electronic apparatus that needs optical sensing devices. Obviously, the problems, vague images or low contrast, restrict applications and functions of the conventional light source structure.

Hence, an improvement over the prior art is required to overcome the disadvantages thereof.

SUMMARY OF INVENTION

The primary object of the invention is therefore to specify a light source structure to provide visible lighting and infrared radiation for a clear and complete image to meet various requirements.

The secondary object of the invention is therefore to specify a light source structure with a thin plate, which thickness is equivalent to that of a visible-light member, to shrink the size thereof and to save materials and costs.

The third object of the invention is therefore to specify a light source structure with a high luminance and a high uniformity thereof without different traveling due to a cutout that is used to receive a CCFL conventionally.

According to the invention, this object is achieved by a light source structure includes a guidelight plate, a visible-light member disposed on at a first side of the guidelight plate, and an infrared-radiation member disposed on a second side of the guidelight plate. Whereby the visible-light member and the infrared-radiation member reveal a surface of a predetermined object, and provide revealed images that is capable of combining as a complete image.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE EMBODIMENTS

Figure 1:
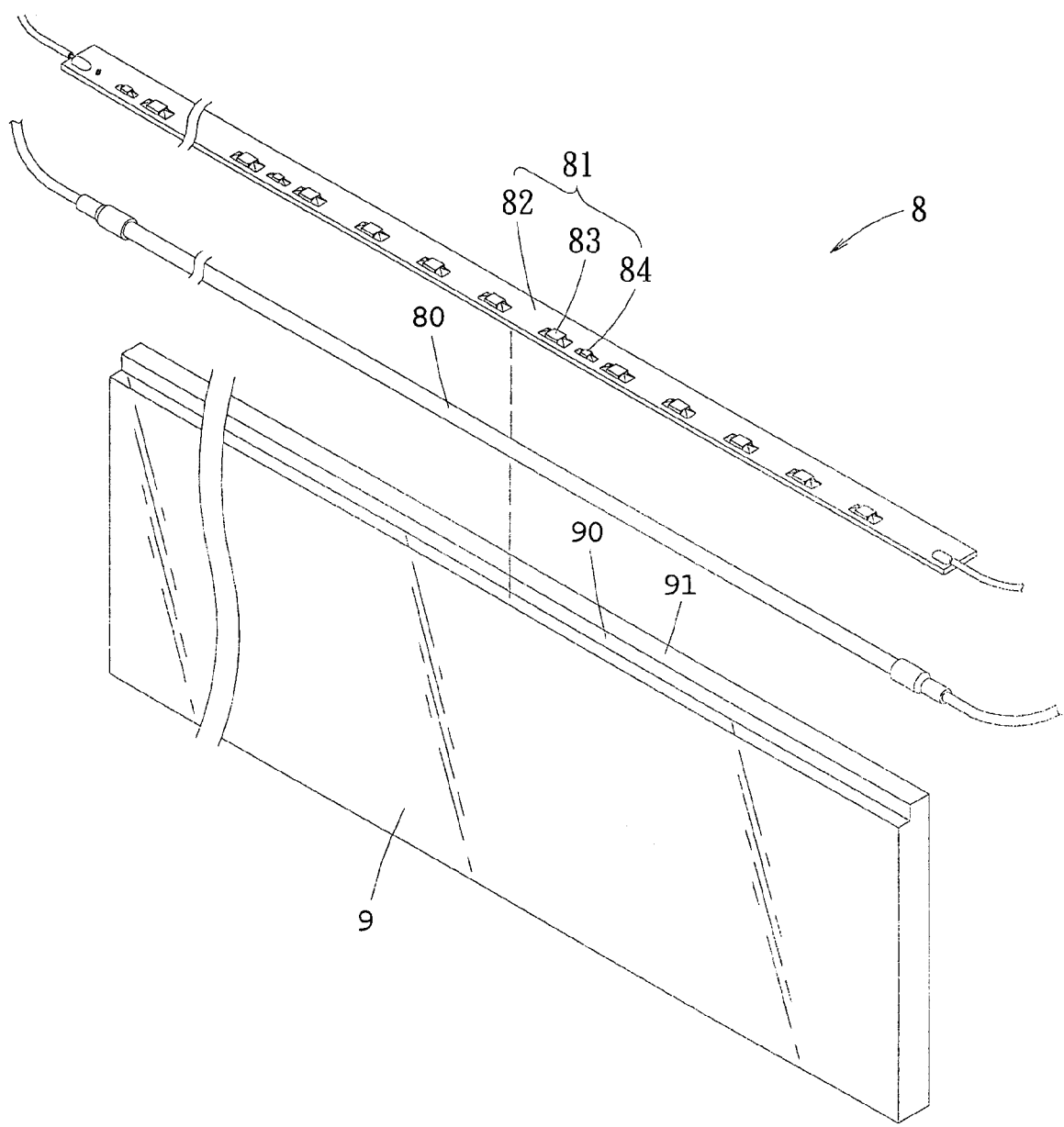
FIG. 1 is a decomposition view according to a conventional light source structure.
Figure 2:
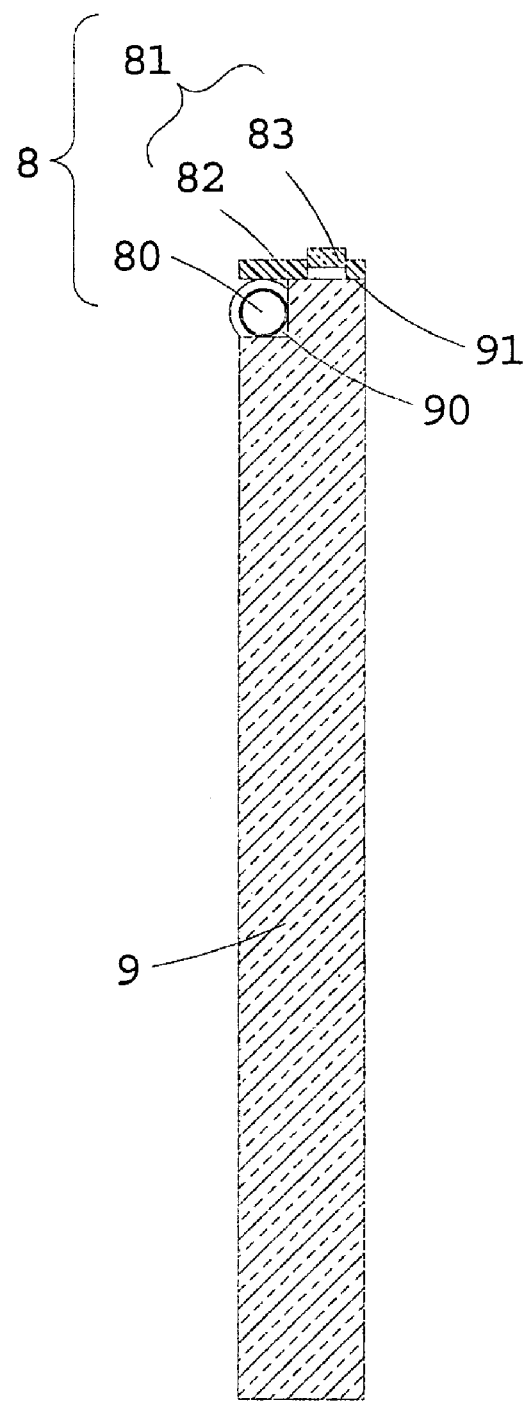
FIG. 2 is a cross-sectional profile according to the conventional light source structure.
Figure 3:
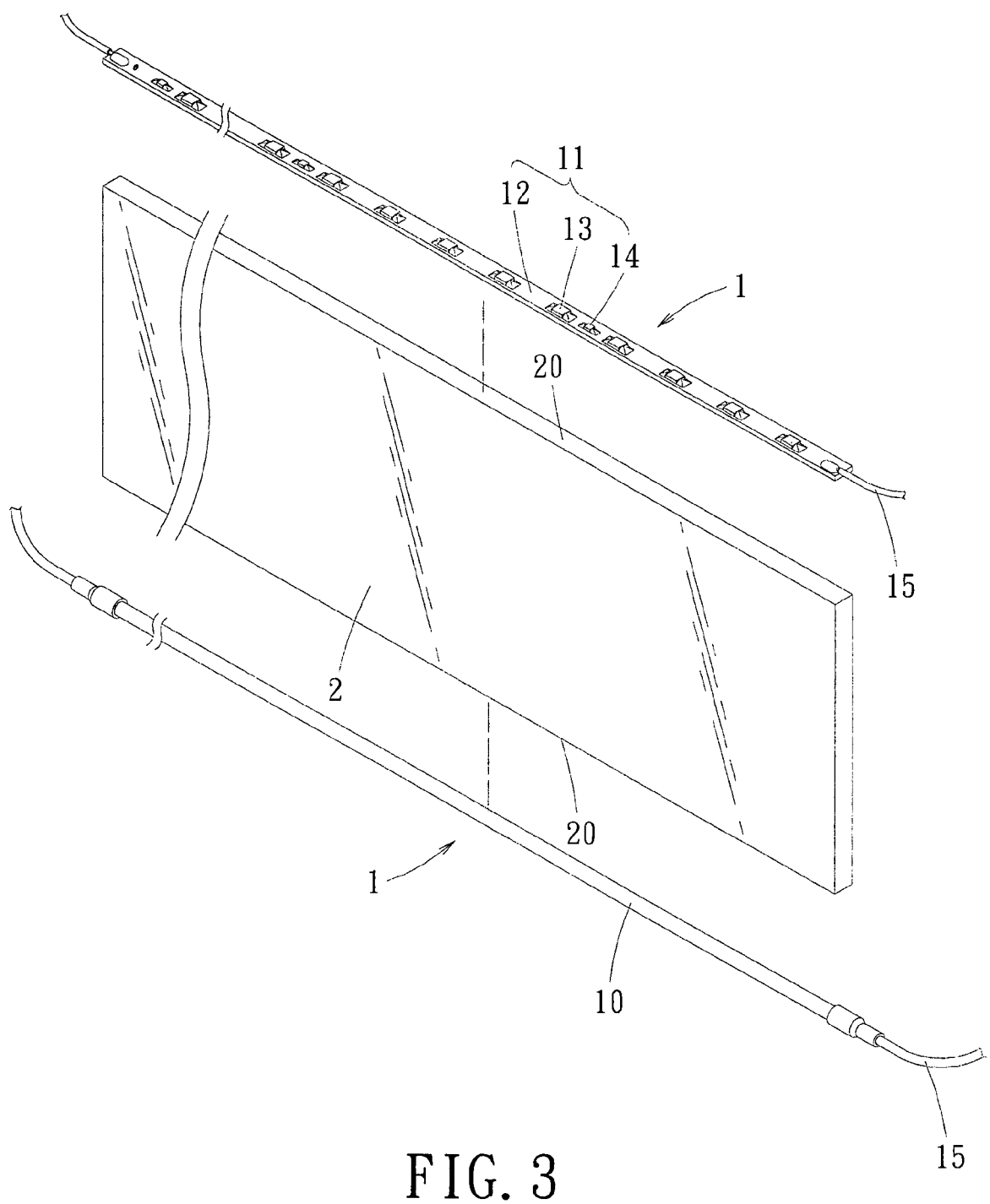
FIG. 3 is a decomposition view of a light source structure according to the present invention.
Figure 4:
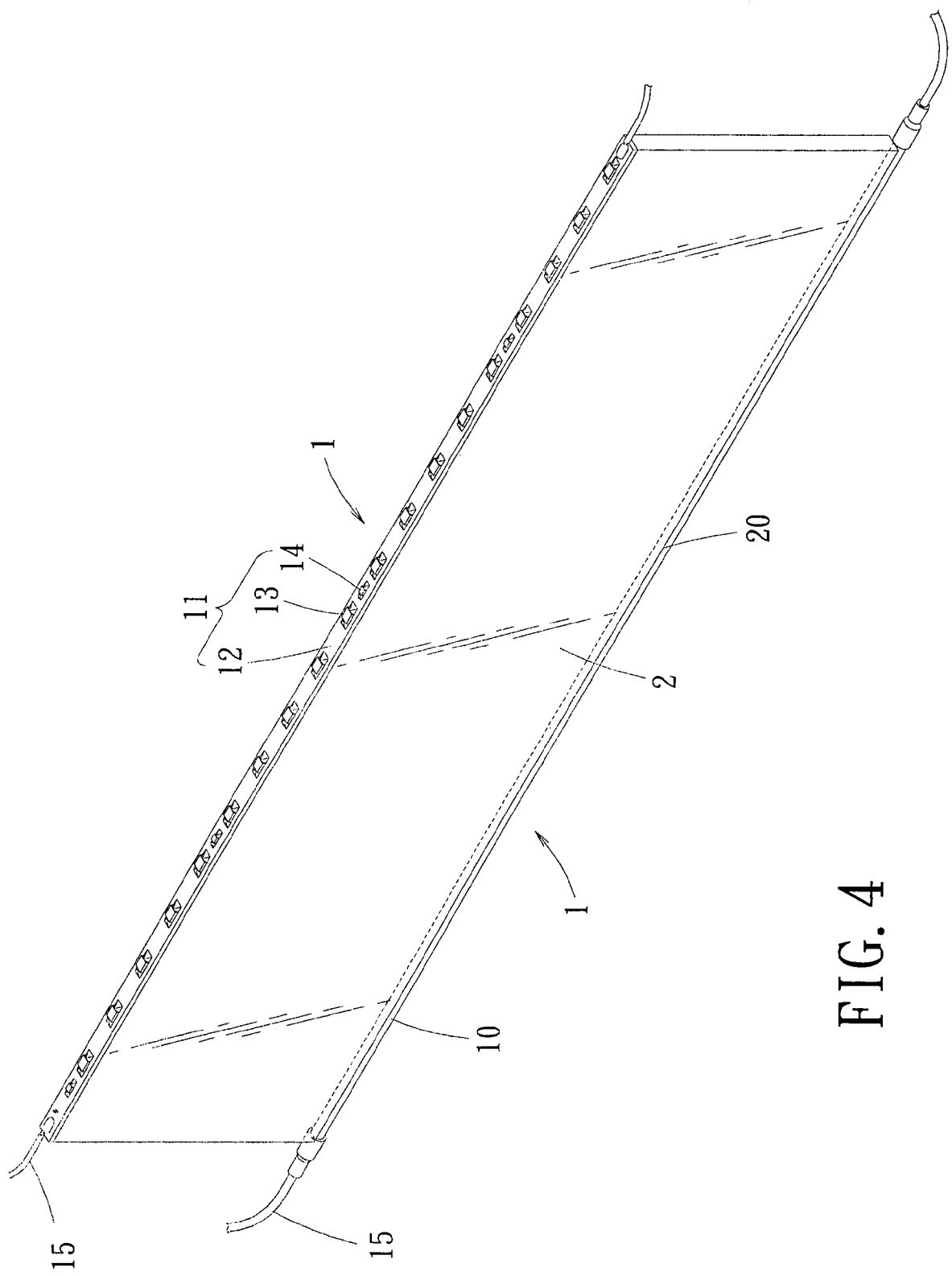
FIG. 4 is a perspective view of the light source structure according to the present invention.
Figure 5:
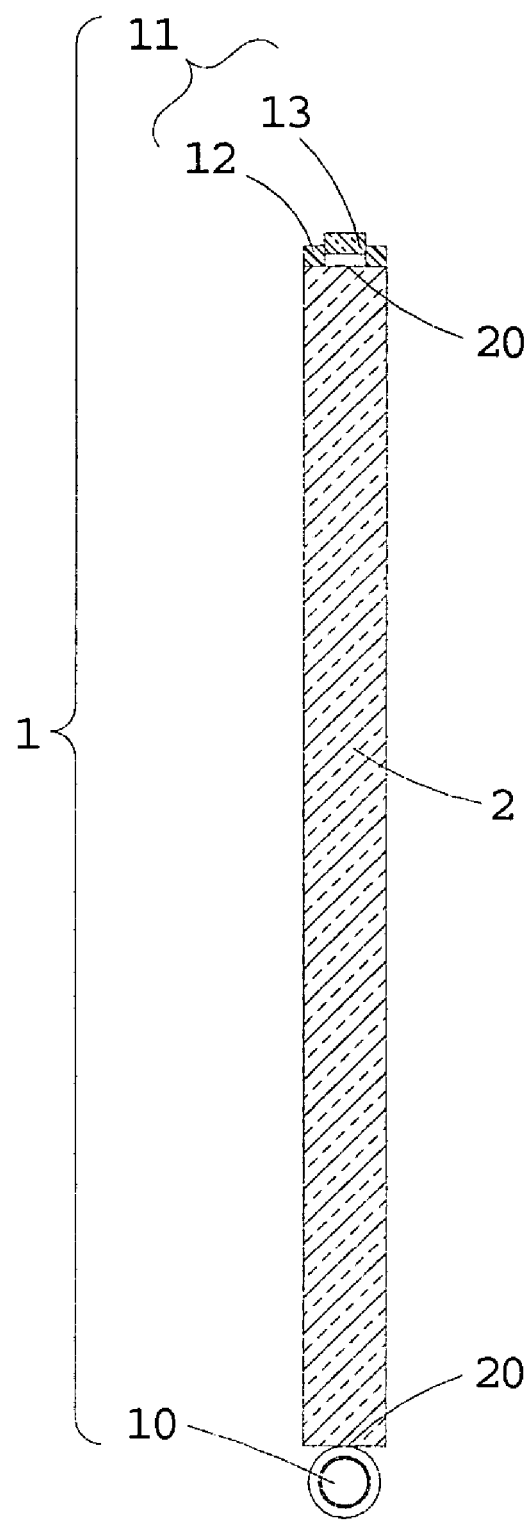
FIG. 5 is a cross-sectional profile of the light source structure according to the present invention.

Referring to FIGS. 3 to 5, a light source structure according to the present invention includes a lighting unit 1 and a guidelight plate 2. The lighting unit 1 has a visible-light member 10 and an infrared-radiation member 11 arranged on different sides of the guidelight plate 2. The visible-light member 10 is a CCFL (Cold Cathode Florescent Lamp) in FIG. 3; in an alternative manner, the visible-light member 10 can include a board and a plurality of LEDs that provide visible light and dispose on the board (not shown). The infrared-radiation member 11 includes a circuit board 12, a plurality of LEDs (Light Emitting Diode) 13 and resistors 14 arranged on the circuit board 12. The LEDs 13 provides infrared radiation that is invisible to human. Therefore, the visible-light member 10 provides primary, visible lighting onto a predetermined object via the guidelight plate 2, in order to get a first image sensed by an optical sensor (a normal step). As is known to all, infrared imaging is used to clearly detect materials, wrinkles or blurs around an object. This gives a more complete picture of the whole object. The LEDs 13 provides infrared, invisible radiation to show more details on the predetermined object to get a second image that usually is monochromatic. For ease to get a compete image, a processor (not shown) combines the first and second images to be a whole one. Or, if the wrinkles or the dirt on the predetermined object are not proper to reveal apparently, the infrared-radiation member 11 is controlled to pause, so as to get the first image only.

The visible-light member 10 and the infrared-radiation member 11 respectively connect power cords 15 for power supply. The guidelight plate 2 is flat, rectangular and transparent, and has two elongated sides 20 opposite each other. The visible-light member 10 and the infrared-radiation member 11 are respectively disposed on the two elongated sides 20 in FIG. 4.

When the light source structure is in use, what provides light is the visible-light member 10 provides uniformity, without different traveling due to the cutout 90 that is used to receive the lamp 80 conventionally.

Figure 6:
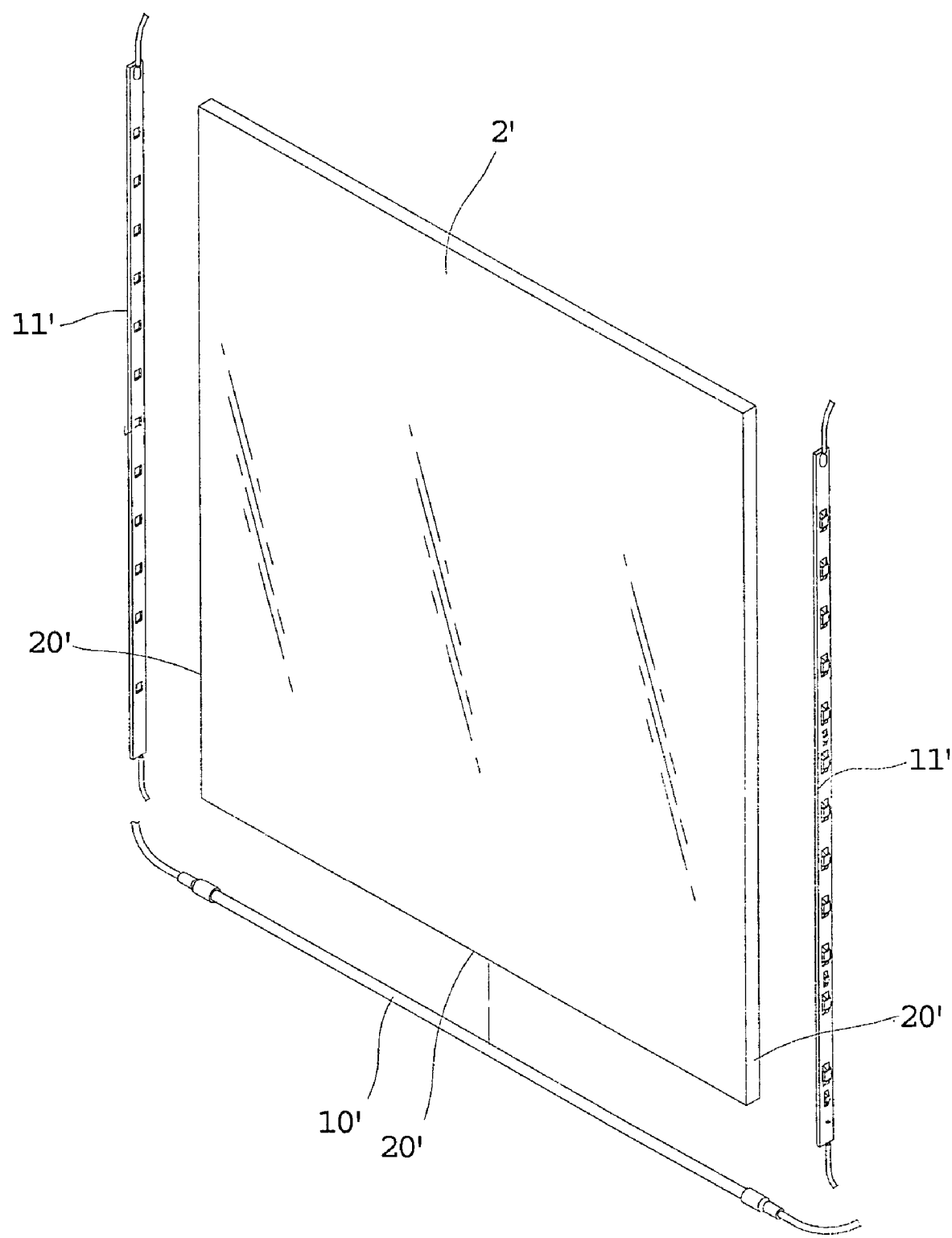
FIG. 6 is a perspective view of the light source structure of another embodiment according to the present invention.

With respect to FIG. 6, another embodiment according to the present invention, the visible-light member 10 disposes on a side 20' of the guidelight plate 2' and two infrared-radiation members 11' are disposed respectively on two lateral sides 20' of the guidelight plate 2'. Wherein the two lateral sides 20' are perpendicular to the side 20'.

According to the present invention, the visible-light member 10 (10') and the infrared-radiation member 11 (11') are respectively disposed on sides of the guidelight plate 2 (2'). The light source structure needs no recess formed in the guidelight plate 2 for receiving the visible-light member 10; thus the guidelight plate 2 has a thin size to shrink a volume thereof and to save costs thereby.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

REFERENCE conventional light source structure
lighting unit 8
lamp 80
lighting component 81
circuit board 82
guidelight plate 9
cutout 90
elongated side 91 the present invention light source structure
lighting unit 1
visible-light member 1, 1'
infrared-radiation member 11, 11'
circuit board 12
power core 15
guidelight plate 0, 0'
side 0, 0'

What is claimed is:

1. A light source comprising: a guidelight plate; a visible-light member disposed on a first side of the guidelight plate; and an infrared-radiation member disposed on a second side of the guidelight plate; whereby the visible-light member and the infrared-radiation member reveal a surface of a predetermined object, and provide a revealed first image and an independent revealed second image that are capable of combining as a complete image.

2. The light source structure as claimed in claim 1, wherein the visible-light member is a CCFL.

3. The light source structure as claimed in claim 1, wherein the visible-light member includes a plurality of LEDs providing visible light.

4. The light source structure as claimed in claim 1, wherein the lighting infrared-radiation member includes a circuit board, a plurality of LEDs providing infrared radiation and arranged on the circuit board, and resistors disposed on the circuit board.

5. The light source structure as claimed in claim 1, wherein the lighting infrared-radiation member and the visible-light member are disposed on opposite, elongated sides of the guidelight plate.

* * * * *